United States Patent

Deschamps et al.

[11] 3,882,222
[45] May 6, 1975

[54] PROCESS FOR PURIFYING A GAS CONTAINING OXYGENATED SULFUR COMPOUNDS AND RECOVERING SULFUR USING AMMONIA LIQUORS

[75] Inventors: André Deschamps, Chatou; Claude Dezael, Maisons-Laffitte; Sigismond Franckowiack, Montesson; Philippe Renault, Noisy-le-Roi, all of France

[73] Assignee: Institut Francais du Petrole, des Carburants et Lubrifiants, Rueil-Malmaison, France

[22] Filed: Feb. 24, 1972

[21] Appl. No.: 228,830

[30] Foreign Application Priority Data
Mar. 9, 1971   France .............................. 71.08198

[52] U.S. Cl................................. 423/575; 423/242
[51] Int. Cl............................................ C01b 17/04
[58] Field of Search ........... 423/222, 234, 242, 574, 423/575, 512, 519

[56] References Cited
UNITED STATES PATENTS

| 927,342 | 7/1909 | Feld et al............................ 423/575 |
|---|---|---|
| 2,004,799 | 6/1935 | Richardson....................... 423/519 |
| 2,134,481 | 10/1938 | Johnstone......................... 423/242 |
| 2,676,090 | 4/1954 | Johnstone......................... 423/242 |
| 2,881,047 | 4/1959 | Townsend......................... 423/575 |
| 3,103,411 | 9/1963 | Fuchs............................. 423/575 X |
| 3,441,379 | 4/1969 | Renault............................ 423/575 |
| 3,447,903 | 6/1969 | Wiewiorowski.................. 423/578 |
| 3,561,925 | 2/1971 | Deschamps et al................. 423/573 |
| 3,676,059 | 7/1972 | Welty............................ 423/519 X |

OTHER PUBLICATIONS

Albertson et al., "Reaction of $H_2S$ & $SO_2$ in Liquid Media," J.A.C.S., Vol. 65, pp. 1690–1691.
Renault et al., "Volatile Bases & Acids Regenerated From Their Salts," Chem. Abstr. Vol. 71, 1969, pg. 143, No. 103698d.

Primary Examiner—O. R. Vertiz
Assistant Examiner—Brian E. Hearn
Attorney, Agent, or Firm—Millen, Raptes & White

[57] ABSTRACT

Sulfur dioxide is removed from a gas by contacting the latter with ammonia and water, concentrating and then vaporizing the resulting ammonium sulfite solution, passing the vapors through a heated liquid phase, recovering sulfur and ammonia and recycling ammonia.

12 Claims, 2 Drawing Figures

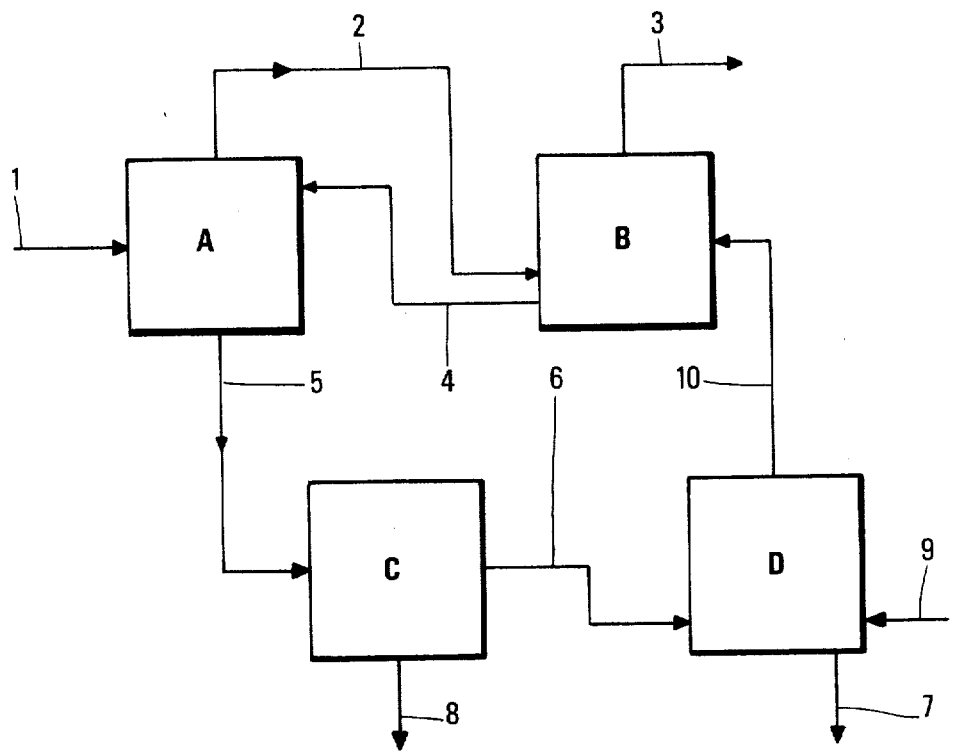
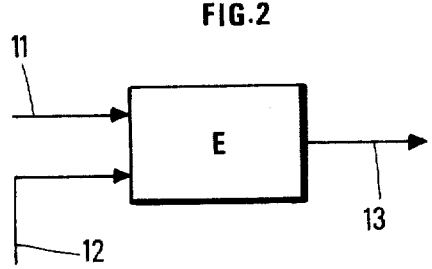
FIG. 2

PROCESS FOR PURIFYING A GAS CONTAINING OXYGENATED SULFUR COMPOUNDS AND RECOVERING SULFUR USING AMMONIA LIQUORS

This invention concerns a process for removing sulfur dioxide contained in a gas, and producing elemental sulfur.

The combustion fumes, particularly those discharged by power plants fed with fuel-oil or any other sulfur containing fuel, or by chemical plants and incinerators burning sulfur compounds, contain sulfur dioxide which is a major polluting agent.

A known process for removing sulfur dioxide from fumes makes use of ammonia. This process, which is conducted at a temperature close to the dew point of the fumes results in a high purification rate, at least 90% of the $SO_2$ present. It produces brines which contain ammonium sulfite and bisulfite and ammonium sulfate corresponding to sulfuric anhydride usually present in the fumes.

The concentration of sulfur dioxide in the form of ammonium sulfite and bisulfite in the brine must be low in order to obtain a high purification of the fumes. For example it is such that the molar ratio of sulfur dioxide to water be from 1 : 10 to 1 : 40.

The applicants have described in the French Patent No. 1,568,748 a process for regenerating ammonia and producing sulfur from these brines. This process consists of reducing ammonium sulfite and bisulfite to sulfur by means of hydrogen sulfide; ammonia evolves according to the following reaction schemes:

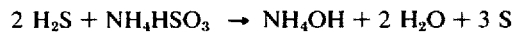
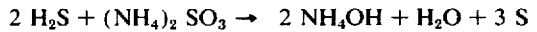

$$2\ H_2S + NH_4HSO_3 \rightarrow NH_4OH + 2\ H_2O + 3\ S$$

$$2\ H_2S + (NH_4)_2SO_3 \rightarrow 2\ NH_4OH + H_2O + 3\ S$$

This is obtained by reacting $H_2S$ with ammonium sulfite or bisulfite at a temperature of from 90 to 150°C, in a solvent such as a glycol.

However, it has been found that the conversion of ammonium sulfite or bisulfite to sulfur is not always performed with a high selectivity and that, when a dilute solution of the sulfite or bisulfite is introduced into the reaction vessel, oxygen-containing sulfur compounds such as thionates, thiosulfates and sulfates are formed in substantial amounts in addition to sulfur itself.

By preliminarily concentrating this solution these undesired by-reactions may be reduced to a certain extent; but it is not possible to suppress the main disadvantage of this technique, i.e. that the ammonium sulfates are not decomposed by hydrogen sulfide and contaminate the resulting sulfur.

One object of this invention is to provide a process which does not suffer from the above disadvantages, and whereby practically pure sulfur is obtained and the sulfur compounds are converted to sulfur with a high selectivity.

This process comprises the following steps: an industrial gas which contains sulfur dioxide and, in some cases, sulfuric anhydride is contacted with ammonia in the presence of water at a temperature of from 30 to 80°C, so as to obtain a solution of ammonium sulfite and, possibly, ammonium sulfate, in which the molar ratio $H_2O/SO_2$ is from 11/1 to 100/1 and preferably from 11/1 to 40/1; said solution is then concentrated by evaporating water at a temperature lower than 100°C, so as to obtain a molar ratio $H_2O/SO_2$ in the range of from 4/1 to 10/1 without substantial decomposition of the ammonium salts. The resulting concentrated solution is heated up to a temperature of from 105 to 200°C to produce a gaseous mixture of sulfur dioxide, ammonia and steam. in which the molar ratio of $H_2O$ to $SO_2$ is about 4 – 10; this gaseous mixture is admixed with hydrogen sulfide and passed through a liquid phase consisting essentially of an organic solvent, at a temperature of from 120° to 170°C, so as to produce sulfur; said sulfur and a gas phase essentially comprising steam and ammonia are separated and ammonia is recycled for further contact with the industrial gas.

Ammonia may be recycled either as an aqueous solution or as a gas.

The heating of the concentrated solution is preferably carried out at a temperature of from 120° to 160°C.

The organic solvent, such as hereinafter defined may contain some water, although, at the contemplated temperature, water is essentially in the gas phase.

In the first step of the process, ammonia is used either as a gas or as a solution, and the temperature may range from 30° to 80°C and preferably from 35° to 50°C. The resulting waste gas may be made free of any sulfuric anhydride, which has been converted to sulfates, and of at least 90 percent of the initial sulfur dioxide.

The industrial waste gas and ammonia are contacted in the presence of water. The latter may be used as such or as an aqueous ammonia solution; it may also result from the cooling of the gas below its dew point. The amount of water thus introduced or condensed is such that the molar ratio of $H_2O$ to $SO_2$ in this zone is about from 11 : 1 to 100 : 1 and preferably from 11 : 1 to 40 : 1.

The solution obtained after washing of the industrial gas essentially contains a mixture of ammonium sulfite and bisulfite with ammonium sulfates, in which the molar ratio of $H_2O$ to $SO_2$ ranges from 11 : 1 to 100 : 1 and preferably from 11 : 1 to 40 : 1 said $SO_2$ being present as a sulfite.

Said solution is concentrated by heating a preferred temperature of from 60° to 80°C. This is preferably obtained by directly contacting the solution with the warm waste gas, for example in a tower where the liquid flows down in counter-current contact with the warm gas, so as to obtain a molar ratio $H_2O/SO_2$ of from 4 to 10. The sulfites concentrated solution is then reheated to 100°–200°C and preferably 120° – 170°C, so as to vaporize at least the major portion of the sulfites; the sulfates do not vaporize and form a residue which may be eliminated in that step.

The vapor produced at this stage, which essentially contains sulfur dioxide, ammonia and water, is reacted with hydrogen sulfide in a third step in contact with a liquid phase containing an organic solvent, at a temperature of from 120° to 170°C. Elemental sulfur is thus obtained and ammonia evolves.

Hydrogen sulfide is used in an amount resulting in a molar ratio $H_2S$/sulfite + bisulfite of about 2, for example 1.9 – 2.2.

Many organic solvents may be used at this stage of the process, for example tetramethylene sulfone, N-methyl pyrrolidone, heavy alcohols having, for example, 12–20 carbon atoms, esters of alcohols and, as a rule, any liquid medium inert with respect to such compounds as $H_2S$ and $SO_2$ at the reaction temperature.

The following solvents are preferably used since they are quite stable and permit a high reaction rate and selectivity: alkylene glycols and their ethers and esters, poly-alkylene glycols and their esters and ethers, particularly ethylene glycol, polyethylene glycols and their ethers and esters. These solvents are referred to as "solvents of the glycol type."

Said solvents may be illustrated by the following examples: ethylene glycol, triethylene glycol, heptaethylene glycol, di-1,3-propylene glycol, penta-1,3-propylene glycol, deca-ethylene glycol mono-ethyl ether, tetra-1,4-butene glycol, polyethylene glycol of average molecular weight 400, hexa-ethylene glycol mono-propyl ether mono-acetate or monobutyrate.

Hydrogen sulfide may be produced by reacting sulfur with a hydrocarbon, or it may be recovered from refinery amines washing units or from gas-treating plants.

This purification process may be applied to gases which contain $SO_2$ as the sole acid sulfur compound. The stack gas from power plants fed with fuel-oil or any other sulfur-containing fuel are a major example of this type of gas.

However the process is also useful for treating such gases as the discharge gases from Claus units which contain $SO_2$ and such compounds as $H_2S$, COS and $CS_2$. It is then sufficient to convert said compounds to sulfur dioxide, for example by burning them with oxygen at about 400°–600°C, and subjecting the resulting gas to the treatment according to the invention.

The process applies particularly to the gases which have a low sulfur dioxide content, for example from 0.02 to 10 percent and preferably from 0.1 to 2 percent by volume. The $SO_3$ content is usually lower than that of $SO_2$, for example from 0.001 to 1 percent by volume.

The apparatuses used for absorbing sulfur dioxide and concentrating it may be of any known type, for example empty towers, packed towers or plates towers, the reactants circulating in co-current or, preferably, in counter-current contact; alternatively the liquid phase may be stationary and receive the gas flow therethrough. Stirring devices or re-circulation pipes may also be provided in each apparatus: in the latter case, the liquid mixture in the $SO_2$ absorption zone is a dilute aqueous solution of ammonium sulfite which receives both the gas to be purified and the recycled ammonia.

The figures of the drawing are schematic flowsheets of the examples.

The following examples are given for illustration purposes:

EXAMPLE 1

13 Nm³ per hour of a stack gas produced by a fuel-oil burner and containing 0.01 percent of sulfuric anhydride and 0.2 percent of sulfur dioxide are treated according to the process of FIG. 1.

The gas is introduced through line 1 into the concentrator A in which it is directly contacted with the diluted sulfite brine received through line 4 from the stage B in which sulfuric anhydride and sulfur dioxide are withdrawn from the waste gas.

The temperature is 50°C in stage B and 65°C in the concentration stage A.

The waste gas is discharged through line 3. It is free of $SO_3$ and contains no more than 0.02 percent of $SO_2$.

The concentrated brine is circulated through line 5 and introduced into the evaporator C maintained at 150°C.

A crystallized residue consisting essentially of ammonium sulfate or a concentrated solution of said salt is discharged through pipe 8. The vapors produced in C are passed through line 6 and introduced into the reactor D in which the sulfites are converted to sulfur at 150°C, in contact with a polyethylene glycol having a molecular weight of 400, hydrogen sulfide being introduced through line 9 at a rate corresponding to a molar ratio $H_2S$/sulfites of 2.

The outflow from reactor D essentially contains ammonia and steam; it is conveyed through line 10 to stage B. The resulting liquid sulfur is conveyed through line 7.

The sulfite content of the brine is such that the molar ratio $H_2O/SO_2$ is 17 in line 4 and 5.2 in line 5.

The sulfite conversion rate is 99 percent and the reaction selectivity is 99.7 percent.

The conversion rate and the selectivity are as hereinafter defined:

$$\text{conversion rate} = \frac{\text{moles of converted sulfite}}{\text{moles of introduced sulfite}}$$

$$\text{selectivity} = \frac{\text{moles of sulfite converted to sulfur}}{\text{moles of converted sulfite}}$$

The resulting sulfur is practically pure.

EXAMPLE 1 bis

By way of comparison, the waste gas, defined in example 1 has been subjected to the same treatment as described in this example (FIG. 1), except that the brine has not been concentrated. The diluted brine recovered in B with the same composition as in example 1 ($SO_2/H_2O = 17$) directly feeds the evaporator C. The other operating conditions are unchanged.

The same purification of the gas as described in Example 1 has been achieved; however the sulfite conversion rate in reactor (D) is 80 percent and the selectivity amounts to 96 percent. The sulfur is practically pure.

EXAMPLE 1 ter

By way of comparison, the gas of Example 1 has been treated as described in this example (FIG. 1), except that the concentrated brine has not been vaporized: the concentrated brine withdrawn from A with a molar ratio $SO_2/H_2O$ of 5.2 has been directly supplied to reactor (D), the other conditions being unchanged.

The same purification of the gas as described in Example 1 has been achieved; however the sulfites conversion rate was 92 percent in reactor (D) and the reaction selectivity amounted to 89 percent. Sulfur was fouled with ammonium sulfate.

EXAMPLE 2

10 Nm³ per hour of a gas such as that discharged from a plant ensuring the conversion of $H_2S$ to sulfur, and having the following % molar composition:

| $H_2S$ | $SO_2$ | $CS_2$ | COS | S | $H_2O$ | $CO_2$ | $H_2$ | $N_2$ |
|---|---|---|---|---|---|---|---|---|
| 0.6 | 0.3 | 0.05 | 0.12 | 0.38 | 29.5 | 2.3 | 1.2 | 65.55 | are treated according to the scheme of FIG. 1 with the device of FIG. 2 connected thereto.

The gas is introduced through line 11 into incinerator E (FIG. 2) with a mixture of air and methane line 12. The gas which escapes in 13 contains 1.15 percent by volume of sulfur dioxide. After cooling it is treated as described in Example 1 (FIG. 1): it passes directly from line 13 to line 1 of FIG. 1.

The conditions are those of Example 1; however the temperature is 50°C in stage B and 85°C in the concentration stage A.

The purified gas escaping in 3 has a 0.06 percent $SO_2$ content. Sulfates, in the form of thiosulfates, are continuously withdrawn through line 8.

The sulfite concentration of the brine results in a molar ratio $H_2O/SO_2$ of 30 in line 4 and 6 in line 5.

The sulfite conversion rate is 99 percent and the selectivity 99.5 percent.

EXAMPLE 3

Example 1 is repeated except that the solvent is N-methyl pyrrolidone in reactor D, the other conditions being unchanged.

The sulfite conversion rate is 95 percent and the selectivity 94 percent.

EXAMPLE 4

Example 1 is repeated except that the solvent is sulfolane in reactor (D), the other conditions being unchanged.

The sulfite conversion rate is 90 percent and the selectivity 94 percent.

What we claim is:

1. A process for removing sulfur dioxide from a gas containing it, wherein the gas is contacted with ammonia and water at a temperature of from 30° to 80° C so as to obtain a solution of ammonium sulfites in which the molar ratio of $H_2O$ to ammonium sulfites (expressed as $SO_2$) is from 11 : 1 to 100 : 1, the solution is concentrated in a concentration zone by evaporating water at a temperature lower than 100° C so as to obtain a molar ratio of $H_2O$ to $SO_2$ of 4 : 1 to 10 : 1, the resulting concentrated solution is heated up to 105°–200° C so as to convert at least the major portion of the ammonium sulfites therein into a gas mixture of sulfur dioxide, ammonia and steam, and so as to produce a more concentrated residual solution containing ammonium sulfates, said residual solution being discharged from the process, said gas mixture is then passed with hydrogen sulfide through a liquid phase consisting essentially of an organic solvent, at a temperature of from 120° to 170°C, so as to produce sulfur, said sulfur and a gas phase consisting essentially of steam and ammonia are separated from the liquid phase, and ammonia is recirculated through the zone of contact with the sulfur dioxide containing gas.

2. A process according to claim 1, wherein the treated gas also contains sulfuric anhydride.

3. A process according to claim 1, wherein the solvent is of the glycol type.

4. A process according to claim 1, wherein the concentrated solution is heated to 120°–160°C.

5. A process according to claim 4, wherein the molar ratio of the hydrogen sulfide to the gaseous sulfur dioxide is from 1.9 to 2.2.

6. A process according to claim 1, wherein the molar ratio of $H_2O$ to the ammonium sulfites expressed as $SO_2$, is from 11 : 1 to 40 : 1, in the gas contact zone.

7. A process according to claim 6, wherein the gas contains 0.02 – 10 percent by volume of sulfur dioxide.

8. A process according to claim 7, wherein the gas also contains 0.001 – 1 percent by volume of sulfuric anhydride.

9. A process according to claim 1, wherein the sulfur dioxide containing gas is contacted with the ammonium sulfite solution in the concentration zone before being contacted with ammonia and water in the contact zone.

10. A process according to claim 9, wherein the contact with ammonia is conducted at 35°–50°C and the concentration of the solution is performed at 60°–80°C.

11. In a process for removing sulfur dioxide from a gas containing it wherein the sulfur dioxide is absorbed in an ammoniacal aqueous solution and has a molar ratio of $H_2O$ to ammonium sulfites (expressed as $SO_2$) from 11 : 1 to 100 : 1 and in a subsequent step the resultant solution of ammonium sulfites is converted into a gaseous mixture of sulfur dioxide, ammonia and steam, the improvement which comprises concentrating said ammoniacal solution by evaporating water therefrom at a temperature lower than 100°C so as to obtain a molar ratio of $H_2O$ to $SO_2$ of 4 : 1 to 10 : 1.

12. A process as defined by claim 11 wherein said conversion of ammonium sulfites is conducted by heating the concentrated ammoniacal solution to 105°–200°C to convert at least a major portion of the ammonium sulfites into a gaseous mixture of sulfur dioxide, ammonia and steam, and form a more concentrated residual solution containing ammonium sulfate which is separated from said gaseous mixture.

* * * * *